United States Patent
Biba et al.

(10) Patent No.: US 7,090,181 B2
(45) Date of Patent: Aug. 15, 2006

(54) BALL AND SOCKET MOUNTING ASSEMBLY

(75) Inventors: Scott Ignatius Biba, Highland, WI (US); Cory Richard Boudreau, Madison, WI (US); Todd James Bakken, Madison, WI (US); Ami Marie Verhalen, Sun Prairie, WI (US)

(73) Assignee: Gamber Johnson LLC, Stevens Point, WI (US)

( * ) Notice: Subject to any disclaimer, the term of this patent is extended or adjusted under 35 U.S.C. 154(b) by 18 days.

(21) Appl. No.: 10/936,530

(22) Filed: Sep. 9, 2004

(65) Prior Publication Data

US 2005/0095058 A1 May 5, 2005

Related U.S. Application Data

(60) Provisional application No. 60/515,670, filed on Oct. 31, 2003.

(51) Int. Cl.
*F16C 11/06* (2006.01)

(52) U.S. Cl. .............. 248/288.31; 248/288.51; 403/56; 403/122

(58) Field of Classification Search ............ 248/288.3, 248/276.1, 274.1, 288.51, 181.1, 181.2; 403/122, 403/124, 125, 126, 127, 56, 90, 76, 77, 132, 403/133

See application file for complete search history.

(56) References Cited

U.S. PATENT DOCUMENTS

| 180,881 A | 8/1876 | Howson |
|---|---|---|
| 596,729 A | 1/1898 | White |
| 829,105 A | 8/1906 | Doherty |
| 890,656 A | 6/1908 | Johnson |
| 958,052 A * | 5/1910 | Williams ............... 248/60 |
| 1,009,913 A | 11/1911 | Maguire |
| 1,280,013 A | 9/1918 | Goddard |
| 1,455,441 A * | 5/1923 | La Hodny ............ 248/484 |
| 1,934,223 A | 11/1933 | Booth |
| 2,533,494 A | 12/1950 | Mitchell, Jr. |
| 2,560,556 A | 7/1951 | Creedon |
| 2,650,788 A | 9/1953 | Hulstein |
| 2,710,609 A | 6/1955 | Giller |
| 2,723,823 A | 11/1955 | Polk, Jr. |
| 2,861,501 A | 11/1958 | Strelakos |
| 3,691,788 A | 9/1972 | Mazziotti |
| 3,843,272 A * | 10/1974 | Jorn ..................... 403/132 |
| 4,225,258 A * | 9/1980 | Thompson ............ 403/56 |
| 4,461,284 A * | 7/1984 | Fackler ................ 600/228 |

(Continued)

FOREIGN PATENT DOCUMENTS

SE              497         3/1886

*Primary Examiner*—Anita M. King
(74) *Attorney, Agent, or Firm*—Oblon, Spivak, McClelland, Maier & Neustadt, P.C.

(57) ABSTRACT

A mounting assembly includes a connecting subassembly having first and second exterior arms, and an interior arm having first and second ends disposed between the first and second exterior arms. The first end of the interior arm and a portion of the first exterior arm define a first socket. The second end of the interior arm and a portion of the second exterior arm define a second socket. First and second mounting members disposed in the respective first and second sockets.

33 Claims, 6 Drawing Sheets

U.S. PATENT DOCUMENTS

| | | |
|---|---|---|
| 4,620,813 A | 11/1986 | Lacher |
| 4,800,795 A | 1/1989 | Yamashita |
| 5,071,279 A | 12/1991 | Rutstrom |
| 5,251,859 A | 10/1993 | Cyrell et al. |
| 5,419,522 A * | 5/1995 | Luecke et al. ......... 248/288.51 |
| 5,588,767 A | 12/1996 | Merlo |
| 5,845,885 A | 12/1998 | Carnevali |
| 5,897,417 A | 4/1999 | Grey |
| 6,109,815 A * | 8/2000 | Merlo ..................... 403/90 |
| 6,561,476 B1 * | 5/2003 | Carnevali ............ 248/288.31 |
| 6,581,892 B1 * | 6/2003 | Carnevali ............. 248/276.1 |

* cited by examiner

BALL AND SOCKET MOUNTING ASSEMBLY

BACKGROUND OF THE INVENTION

1. Field of the Invention

The present invention relates to a mounting assembly, and more particularly to a ball and socket mounting assembly that can be used to mount a portable device to surface.

2. Background of the Invention

It is known to use conventional mounting devices to mount a variety of components to a variety of surfaces. U.S. Pat. No. 5,845,885, the disclosure of which is herein incorporated by reference, shows an example of such a conventional mounting device. The conventional mounting devices, however, suffer from a number of disadvantages. These disadvantages include difficulty in installation and adjustment of the mounting device, as well as difficulty in adjustment of position and orientation of components on the mounting device. Further, the conventional mounting devices are complex to assemble and manufacture, thereby increasing the costs of these devices.

BRIEF SUMMARY OF THE INVENTION

The present invention can obviate one or more of the above disadvantages, or other disadvantages of the conventional mounting device.

The present invention can provide a mounting assembly including a connecting subassembly having first and second exterior arms, and an interior arm having first and second ends disposed between the first and second exterior arms. The first end of the interior arm and a portion of the first exterior arm define a first socket. The second end of the interior arm and a portion of the second exterior arm define a second socket. First and second mounting members disposed in the respective first and second sockets.

The present invention can further provide a method of adjusting a mounting assembly including an interior arm disposed between first and second exterior arms, the interior arm and the first exterior arm defining a first socket in which a first mounting member is disposed, and the interior arm and the second exterior arm defining a second socket in which a second mounting member is disposed. The method can include rotating a cam lever to a first position configured to permit movement of at least one of the first and second mounting members, and rotating the cam lever to a second position configured to prevent movement of at least one of the first and second mounting members.

BRIEF DESCRIPTION OF THE DRAWINGS

A more complete appreciation of the present invention, and many of the attendant advantages thereof, will be readily ascertained or obtained as the present invention become better understood by reference to the following detailed description when considered in connection with the accompanying drawings, wherein.

DETAILED DESCRIPTION OF THE INVENTION

A detailed description of the present invention, including non-limiting examples of one or more preferred embodiments of the present invention, is now provided with reference to the drawings, wherein like reference numbers throughout the several views identify like or similar elements.

Figure 3:
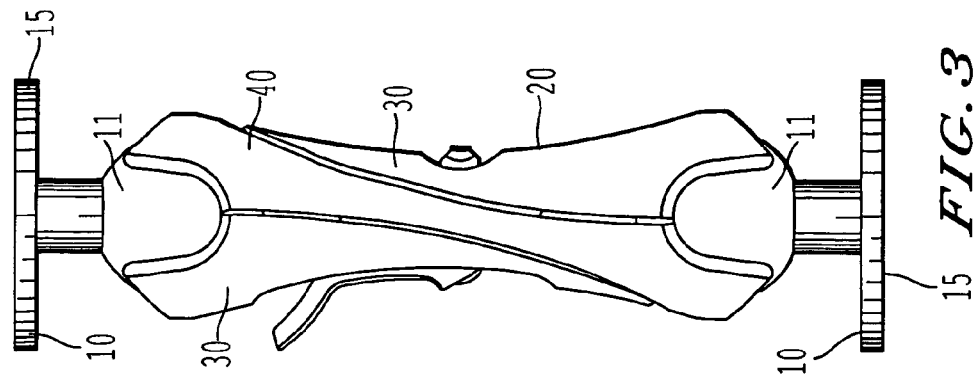
FIG. 3 shows a side view of the mounting assembly of FIG. 1.
Figure 2:
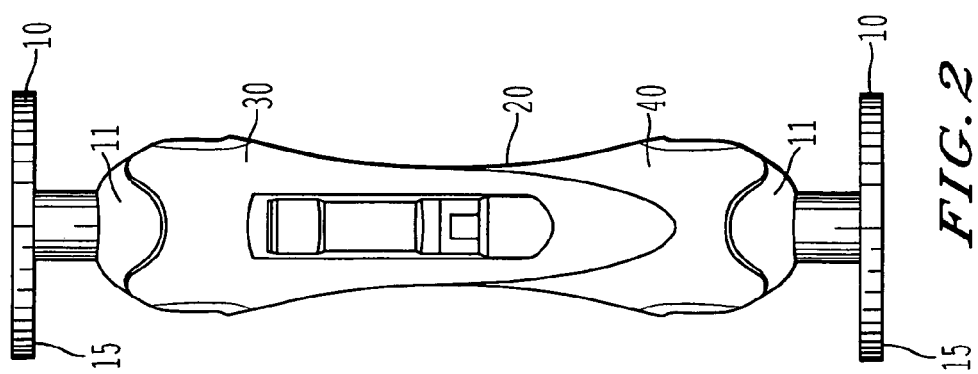
FIG. 2 shows a top view of the mounting assembly of FIG. 1.
Figure 1:
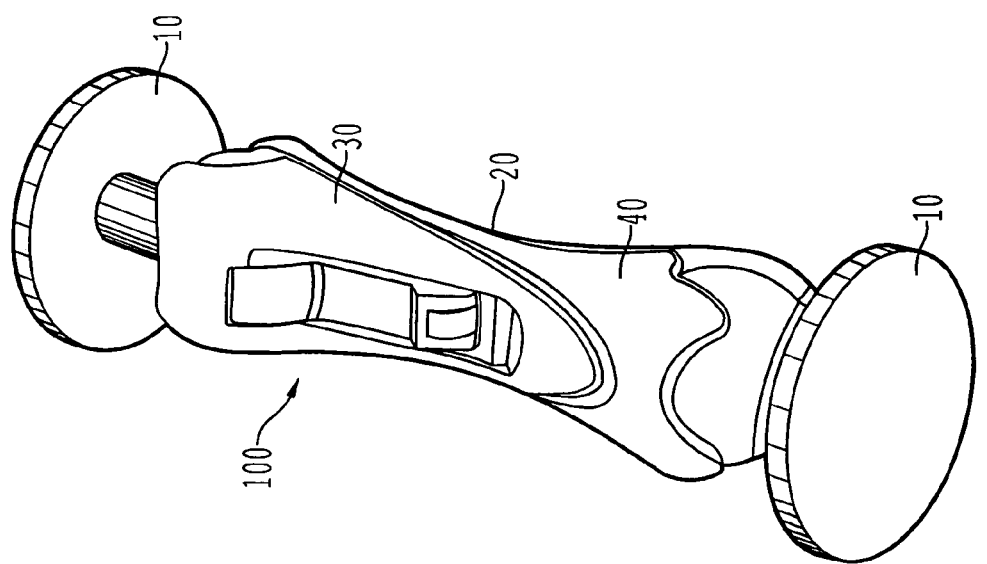
FIG. 1 shows an isometric view of a mounting assembly according to the present invention.
Figure 4:
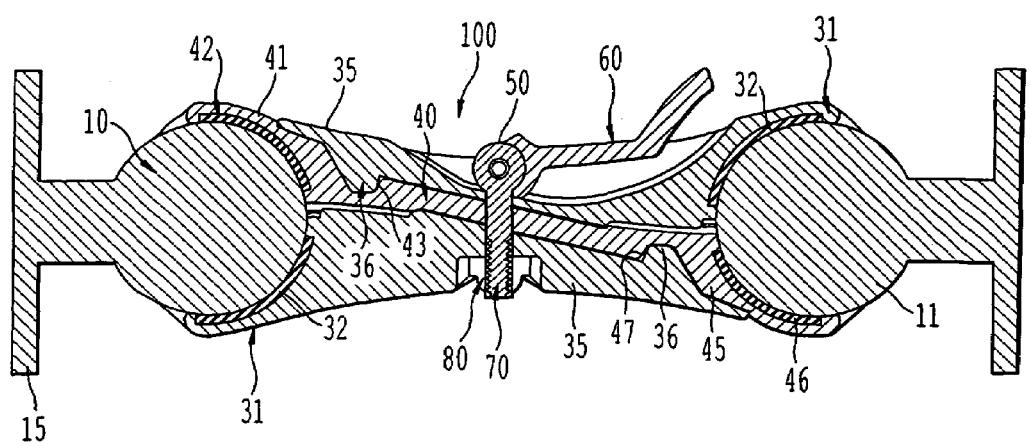
FIG. 4 shows a cross-sectional view of the mounting assembly of FIG. 1.
Figure 5:
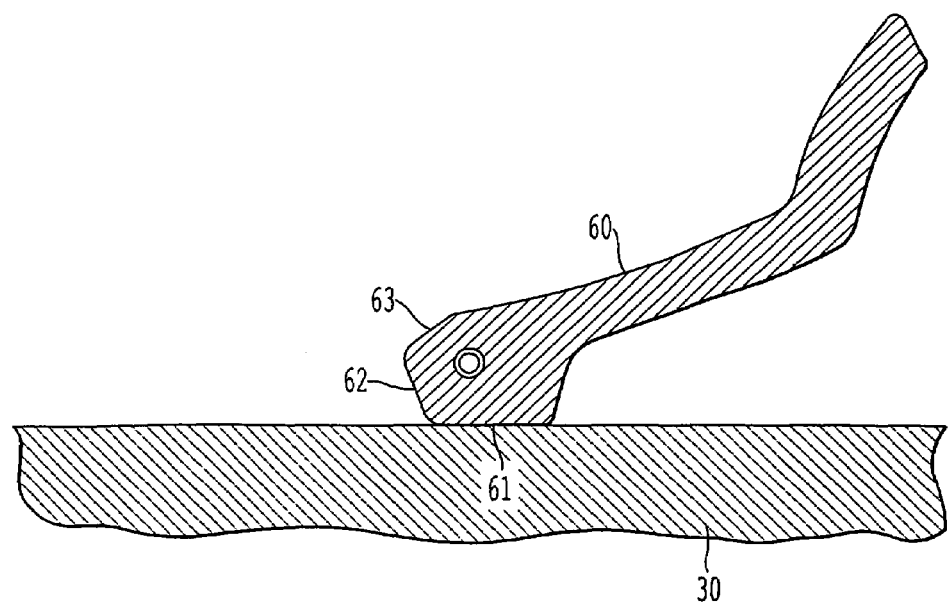
FIG. 5 shows a detail view of a cam lever of the mounting assembly of FIG. 1.

FIG. 1 shows an isometric view of a mounting assembly according to the present invention. FIGS. 2 and 3 show top and side views of the mounting assembly of FIG. 1. FIG. 4 shows a cross-sectional view of the mounting assembly of FIG. 1. FIG. 5 shows a detail view of a cam lever of the mounting assembly of FIG. 1.

As shown in the drawings, a mounting assembly 100 can include mounting members 10 disposed within or retained by a connecting subassembly 20. Although the drawings show preferred embodiments of the mounting members 10, it is to be understood that the mounting members 10 can be of any type, as long as the mounting members 10 can be disposed within or retained by the connecting subassembly 20.

Each of the mounting members 10 can include a first portion 11 and a second portion 15 opposite the first portion 11. The first portion 111 of the mounting member 10 can be configured to be disposed within or retained by the connecting subassembly 20. In a preferred embodiment of the present invention, the first portion 11 can have at least a portion with a substantially spherical shape, such that the first portion 11 can be disposed within or retained by the connecting subassembly 20 having a corresponding shape (as described below). The first portion 11 can have an at least partially textured surface, such that a frictional force can be increased between the first portion 11 and the connecting subassembly 20.

The second portion 15 of the mounting member 10 can be configured to be connected to a surface to which the mounting assembly 100 is to be mounted or to be connected to a portable device to be mounted to the mounting assembly 100. Examples of the surface to which the mounting assembly 100 is to be mounted can include, but are not limited to, an interior or an exterior of a vehicle, and can include an appropriate bracket, flange, or other hardware directly or indirectly connecting to the surface. Examples of the portable device to be mounted to the mounting assembly 100 can include, but are not limited to, global positioning system equipment, radio communication equipment, and computer equipment, and can include an appropriate bracket, flange, or other hardware directly or indirectly connecting to the portable device. The second portion 15 can have a surface corresponding to or permitting mounting of the mounting member 10 to the surface, or can have a surface corresponding to or permitting mounting of the portable device to the mounting member 10. In a preferred embodiment of the present invention, the second portion 15 can have a substantially flat shape, such that the mounting member 10 can be mounted to a variety of surfaces or a variety of device can be mounted thereto, either directly or indirectly.

One or both of the first and second portions 11 and 15 of the mounting member 10 can be manufactured from an at least relatively incompressible material, such that the first portion 11 can remain disposed within or retained by the connecting subassembly 20 during desired use conditions of the mounting assembly 100, or such that the second portion 15 can remain mounted to the surface or the portable device can remain mounted thereto during desired use conditions of the mounting assembly 100.

Although the drawings show preferred embodiments of mounting members 10 that are similar to one another, it is to be understood that the mounting members 10 can be different from one another. It is to be further understood that regardless of whether the mounting members 10 are similar to or different from one another, the second portions 15 of the mounting members 10 can be configured to be connected to an intermediate member, such as a bracket, flange, or other hardware, before mounting to the surface or before the portable device is mounted thereto.

As shown in the drawings, the connecting subassembly 20 can include exterior arms 30, interior arm 40, and an adjustment subassembly 50.

Each of the exterior arms 30 can include a first portion 31 and a second portion 35 opposite the first portion 31. The first portion 31 can be configured to define, with a portion of the interior arm 40 (described below), a socket in which the first portion 11 of one of the mounting members 10 is disposed or retained. In a preferred embodiment of the present invention in which the first portion 11 of the mounting member 10 has at least a portion with a substantially spherical shape, the first portion 31 of the exterior arm 30 can include a corresponding shape, such as an interior portion having a substantially spherical shape.

The first portion 31 of the exterior arm 30 can include a liner 32. In a preferred embodiment of the present invention, the liner 32 can be a compressible liner configured to contact the exterior arm 30 and the member 10. In a preferred embodiment of the present invention, the compressible liner 32 can be manufactured from a relatively compressible material as compared to a material of the first portion 31 of the exterior arm 30 or a material of the first portion 11 of the mounting member 10 disposed within or retained by the exterior arm 30.

The second portion 35 of the exterior arm 30 can include a protrusion 36. The protrusion 36 can be disposed within a corresponding void of the interior arm 40, such that the protrusion 36 of the exterior arm 30 and the corresponding void of the interior arm 40 can act as a pivot point (described below).

The interior arm 40 can include a first portion 41 and a second portion 45 opposite the first portion 41. The first and second portions 41 and 45 can be configured to define, with first portions 31 of each of the exterior arms 30, sockets in which the first portions 11 of the mounting members 10 are disposed. In a preferred embodiment of the present invention in which the first portions 11 of the mounting members 10 have the portions with the about spherical shapes, and in which the first portions 31 of each of the exterior arms 30 have the interior portions with the about spherical shapes, the first and second portions 41 and 45 of the interior arm 40 can include corresponding shapes, such as interior portions having about spherical shapes.

The first and second portions 41 and 45 of the interior arm 40 can include liners 42 and 46, respectively. In a preferred embodiment of the present invention, one or both of the liners 32 and 46 can be a compressible liner configured to contact the interior arm 40 and the members 10. In a preferred embodiment of the present invention, one or both of the compressible liners 42 and 46 can be manufactured from a relatively compressible material as compared to a material of the first and second portion 41 and 45 of the interior arm 40 or a material of the first portion 11 of the mounting member 10 disposed within or retained by the interior arm 40.

The interior arm 40 can define voids 43 and 47 adjacent the first and second portion 41 and 45, respectively. The voids 43 and 47 of the interior arm 40 can be configured to receive the protrusions 36 of the exterior arms 30. By this arrangement, the protrusions 36 of the exterior arms 30 can pivot within the voids 43 and 47 during adjustment of a relative positions or orientation of the mounting members 10 disposed within or retained by the connecting subassembly 20.

The adjustment subassembly 50 can include a cam lever 60, a first retaining fastener 70, and a second retaining fastener 80 configured to cooperate with the first retaining fastener 70. The adjustment subassembly 50 can be configured to permit relative movement of the exterior arms 30 and the interior arm 40, such that the position or the orientation of the connecting subassembly 20 can be adjusted relative to the mounting members 10, or such that the mounting members 10 can be removed from or disposed within the connecting subassembly 20.

The first retaining fastener 70 can be disposed in retaining voids defined by the exterior arms 30 and the interior arm 40. The second retaining fastener 80 can be configured to cooperate with the first retaining fastener 70. In a preferred embodiment of the present invention, the first retaining fastener 70 can include a threaded portion, and the second retaining fastener 80 can include a threading portion corresponding to or configured to threadingly engage with the threaded portion of the first retaining fastener 70. In a preferred embodiment of the present invention, the first retaining fastener 70 can include a bolt, or the second retaining fastener 80 can include a nut disposed on an end of the first retaining fastener 70. The second retaining member 80 can be locked on the first retaining fastener, for example by a chemical thread locking compound.

The cam lever 60 can be disposed on an end of the first retaining fastener 70 opposite the second retaining fastener 80. It is to be understood that rotation of the cam lever 60 about a pivot point on an end of the first retaining fastener 70 can result in a plurality of differently contoured faces of the cam lever 60 facing one of the exterior arms 30. It is to be further understood that as a result of the plurality of differently contoured faces positionable to face the exterior arm 30, movement of the exterior arms 30 and the interior arm 40 relative to one another can be permitted or prohibited, depending on the characteristics of the contoured face. It is to be further understood that as a result of the plurality of differently contoured faces positionable to face the exterior arms 30, removal of the mounting members 10 from the connecting subassembly 20 can be permitted or prevented. In a preferred embodiment of the present invention, the cam lever 60 can be connected to the end of the first retaining fastener 70 via a fastening member, such as a spring pin disposed through voids in the end of the first retaining fastener 70 and the cam lever 60. The cam lever 60 can further define a void configured to permit rotation of the cam lever 60 relative to the first retaining fastener 70 without interference therebetween.

FIG. 5 shows a detail view of the cam lever of FIG. 1. As shown in the figure, the cam lever 60 can include faces 61, 62, and 63. In a preferred embodiment of the present invention, movement of the cam lever 60 to a position where the face 61 is adjacent a surface of the exterior arm 30 can prevent the mounting members 10 from moving relative to the exterior arms 30 and the interior arm 40, as the exterior arms 30 and interior arms 40 are retained in contact with one another. Movement of the cam lever 60 to a position where the face 62 is adjacent the surface of the exterior arm 30 can permit the exterior arms 30 and the interior arm 40 to retain the mounting members 10 while permitting the relative motion thereamong, as the exterior arms 30 and interior arm 40 are permitted to move apart from one another. Movement of the cam lever 60 to a position where the face 63 is adjacent the surface of the exterior arm 30 can permit removal of the connecting subassembly 20 from one or both of the mounting members 10, as the exterior arms 30 and the interior arm 40 are permitted to move apart from one another to a larger extent than when the face 62 is adjacent the surface of the exterior arm 30.

As shown in the drawings, the adjustment subassembly 50 can be disposed nearer one of the mounting members 10 than the other mounting member 10, such as nearer the first portion 41 of the interior arm 40 than the second portion 45 of the interior arm 40. By this arrangement, movement of the cam lever 60 to a position where the face 62 is adjacent a surface of the exterior arm 30 can permit the exterior arms 30 and the interior arm 40 to retain one of the mounting members 10 while permitting removal of the other mounting member 10, or can permit the motion relative to one of the mounting members 10 more easily than to the other mounting member 10. Also by this arrangement, movement of the cam lever 60 to a position where the face 63 is adjacent a surface of the exterior arm 30 can permit the exterior arms 30 and the interior arm 40 to retain one of the mounting members 10 while permitting removal of the other mounting member 10.

The exterior arms 30 can define recesses configured to receive the cam lever 60 and the second retaining fastener 80. In a preferred embodiment of the invention, one of the exterior arms 30 defines the recess to receive the cam lever 60, and the other exterior arm 30 defines the recess to receive the retaining fastener 80. Contours of the recesses can be determined with regard to aesthetic considerations (e.g., such that the cam lever 60, the first retaining fastener 70, or the second retaining fastener 80 do not protrude a predetermined amount beyond the exterior arms 60).

Figure 6:
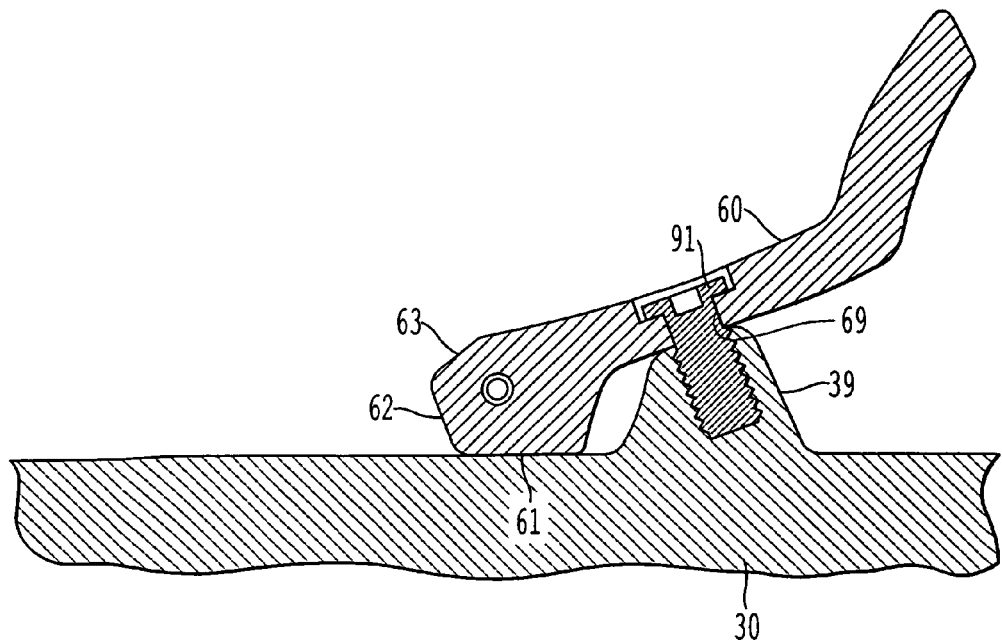
FIG. 6 shows a detail view of another embodiment of a cam lever according to the present invention.

FIG. 6 shows a detail view of another embodiment of a cam lever according to the present invention. As shown in the drawing, the exterior arm 30 can include a securing protrusion 39 configured to receive a cam fastener 91. By this arrangement, after installation and adjustment (e.g., position or orientation) of one or both of the mounting members 10 relative to the connecting subassembly 20, the cam lever 60 can be secured to prevent further adjustment of the mounting assembly 100. Specifically, the cam fastener 91 can be disposed through a void 69 in the cam lever 60 and the securing protrusion 39 of the exterior arm 30, such that the cam fastener 91 can threadingly engage with a corresponding threaded portion of the securing protrusion 39 of the exterior arm 30. Thus, unauthorized adjustment or removal of the mounting assembly 100, as well as the portable device mounted thereon, can be prevented. The cam fastener 91 can be in the form of a bolt with an uncommon or unique head design, to thereby further dissuade unauthorized adjustment or removal of the mounting assembly 100.

Figure 7:
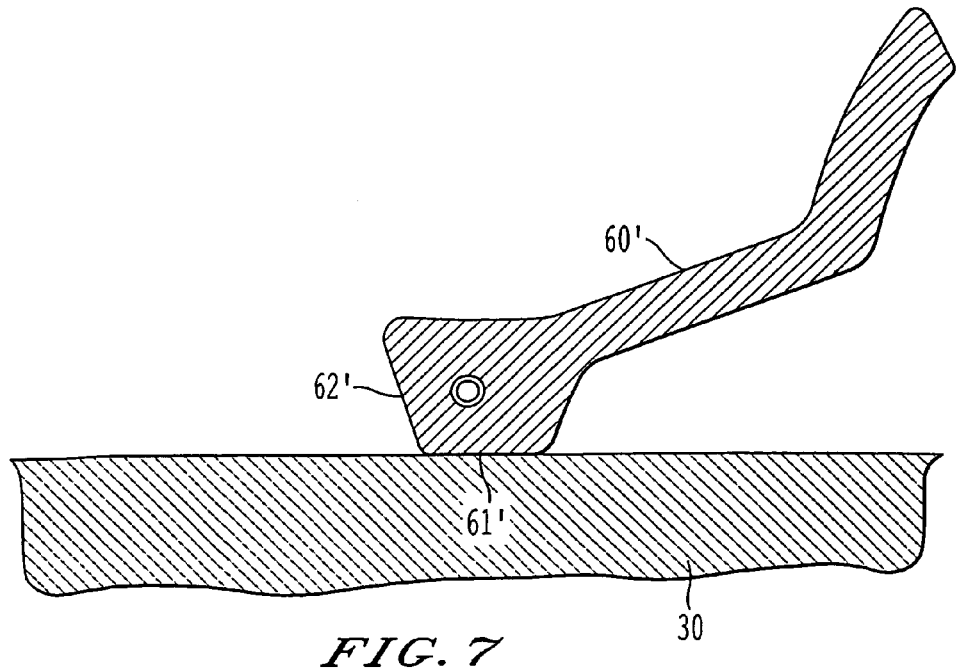
FIG. 7 shows a detail view of another embodiment of a cam lever according to the present invention.

FIG. 7 shows a detail view of another embodiment of a cam lever according to the present invention. As shown in the figure, the cam lever 60' can include faces 61' and 62'. In a preferred embodiment of the present invention, movement of the cam lever 60' to a position where the face 61' is adjacent the surface of the exterior arm 30 can prevent the mounting members 10 from moving relative to the exterior arms 30 and the interior arm 40. Movement of the cam lever 60' to a position where the face 62' is adjacent the surface of the exterior arm 30 can permit the exterior arms 30 and the interior arm 40 to retain the mounting members 10 while permitting the relative motion thereamong. Removal of the connecting subassembly 20 from one or both of the mounting members 10, however, can be prevented.

Figure 10:
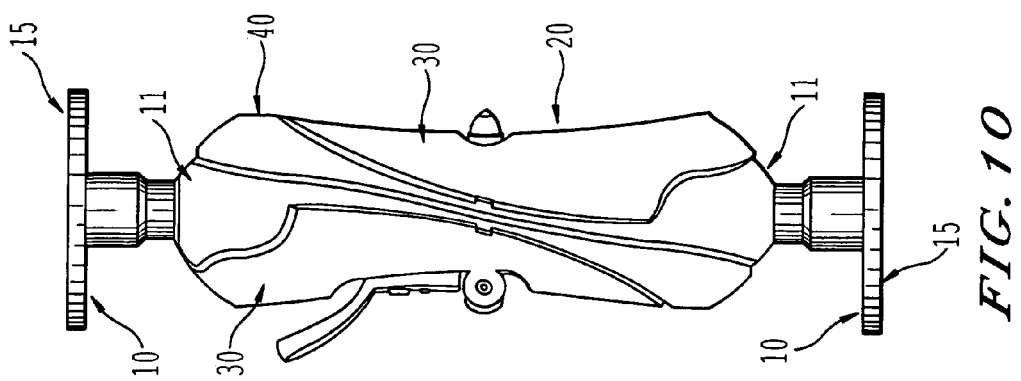
FIG. 10 shows a side view of the mounting assembly of FIG. 8.
Figure 9:
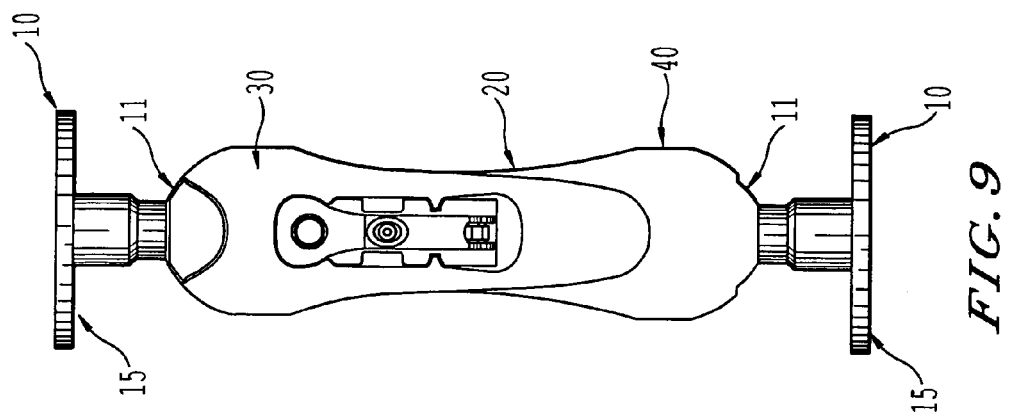
FIG. 9 shows a top view of the mounting assembly of FIG. 8.
Figure 8:
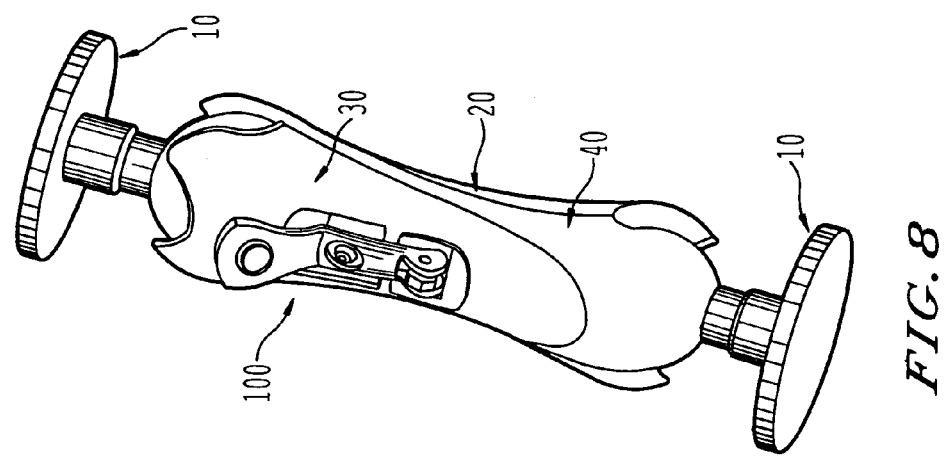
FIG. 8 shows an isometric view of a mounting assembly according to another embodiment of the present invention.
Figure 11:
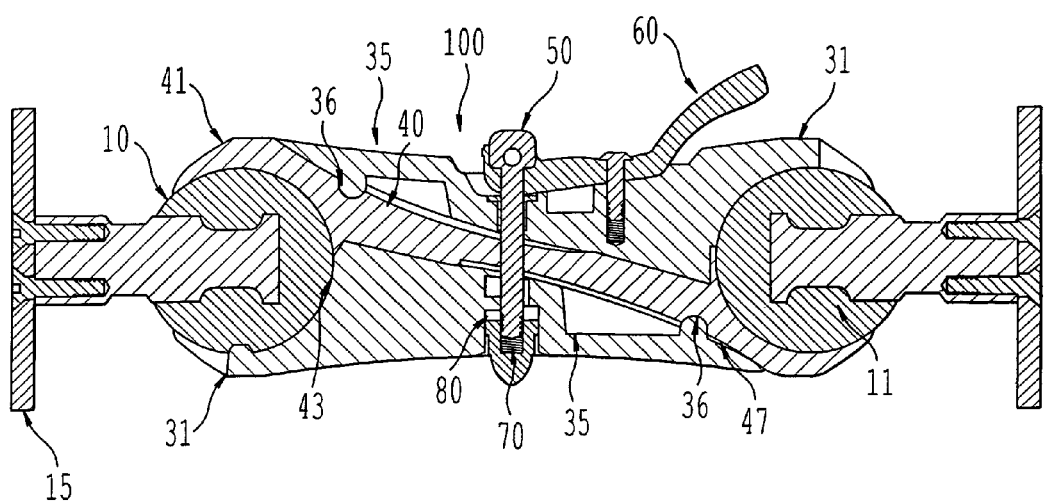
FIG. 11 shows a cross-sectional view of the mounting assembly of FIG. 8.
Figure 12:
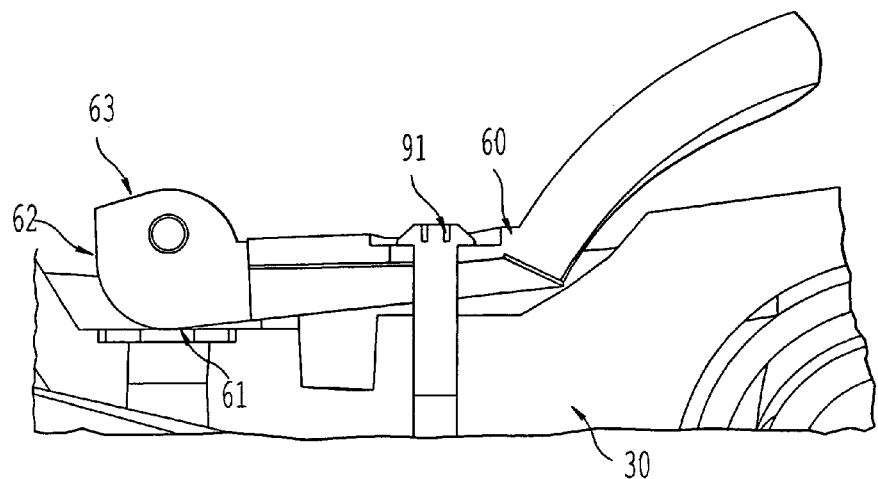
FIG. 12 shows a detail view of a cam lever of the mounting assembly of FIG. 8.
Figure 13:
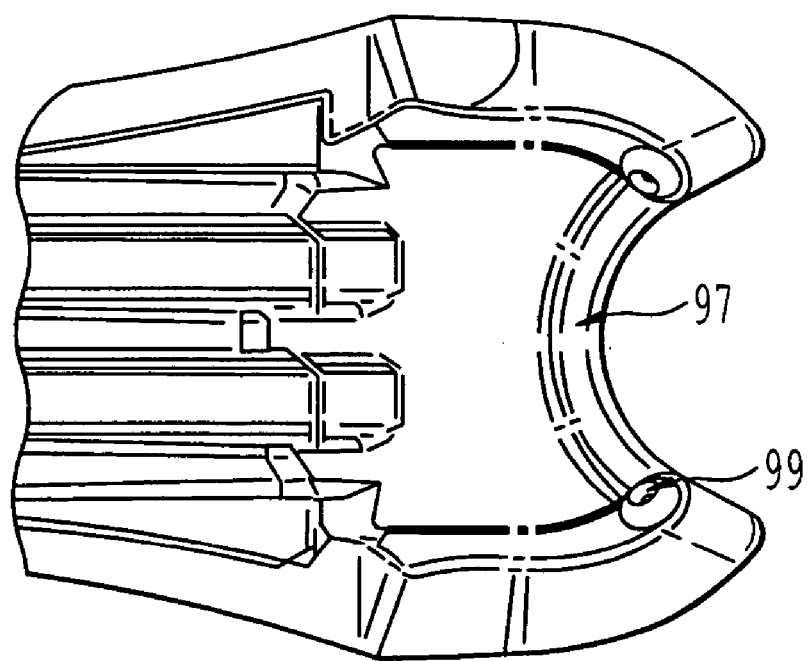
FIG. 13 shows a detail view of the exterior arms/interior arm of the mounting assembly of FIG. 8.

FIGS. 8–13 show another embodiment of the mounting assembly 100. Specifically, FIGS. 8, 9, and 10 show an isometric view, a top view, and a front view of the mounting assembly, respectively. FIG. 11 shows a cross-sectional view of the mounting assembly. FIG. 12 shows a detail view of a cam lever of the mounting assembly. FIG. 13 shows a detail view of the exterior arms/interior arm of the mounting assembly.

As shown in the figures, one or both of the mounting members 10 can include the first portion 11 configured to be attached to or detached from the second portion 15, the first and second portions 11, 15 configured to be connected by one or more fasteners. In a preferred embodiment of the present invention, the substantially spherical portion of the first portion 11 can be formed from an at least relatively compressible material, such as a synthetic rubber formed from chloroprene, the substantially spherical portion disposed on a mounting shaft, the mounting shaft formed from a metal such as stainless steel. In the preferred embodiment, the first and second portion 11, 15 can be connected by two fasteners, such as screws or bolts.

It is to be understood that whether or not the substantially spherical portion of the first portion 11 can be formed from the compressible material, one or more of the liners 32, 42, 46 can be, but need not be, omitted. In a preferred embodiment of the invention including the compressible first portions 11 of the mounting members 10, each of the liners can be omitted.

As shown in the drawings, in a preferred embodiment of the invention, the adjustment subassembly 50 can include the cam lever 60 having faces 61, 62, and 63, as discussed above. In the preferred embodiment, the adjustment subassembly can include the second retaining fastener 80 including a plurality of fasteners, such as a hex nut retained by a self-locking acorn nut. The cam lever 60 can be secured by disposing the cam fastener 91 through the void 69 in the exterior arm 30, such that the cam fastener 91 can threadingly engage with the corresponding threaded portion of the exterior arm 30.

One or more of the exterior arms 30 and the interior arm 40 can include one or more ridges or protrusions. In a preferred embodiment of the present invention, the exterior or interior arms 30, 40 can include one or more of a socket ridge 97 and a socket protrusion 99. Thus, by this arrangement, a frictional force can be increased between the first portion 11 and the connecting subassembly 20. In the preferred embodiment in which the first portions 11 of the mounting members 10 are compressible, each of the exterior and interior arms 30, 40 can include the socket ridges 97 and the socket protrusion 99. Although the drawings show preferred embodiments of the ridges or protrusions, it is to be understood that the ridges or protrusions can be of any type, as long as the frictional force can be increased between the first portion 11 and the connecting subassembly 20.

Numerous additional modifications and variations of the present invention are possible in light of the above teachings. It is therefore to be understood that within the scope of the appended claims, the present invention may be practiced otherwise than as specifically described herein.

What is claimed is:

1. A mounting assembly comprising:
    a connecting subassembly comprising:
        first and second exterior arms; and
        an interior arm having first and second ends disposed between the first and second exterior arms, the first end of the interior arm and a portion of the first exterior arm defining a first socket, and the second end of the interior arm and a portion of the second exterior arm defining a second socket;
    first and second mounting members disposed in the respective first and second sockets; and
    an adjustment subassembly comprising a lever positionable to permit movement of the first mounting member within the first socket upon application of a force insufficient to move the second mounting member within the second socket.

2. The mounting assembly according to claim 1, wherein the first and second sockets have shapes corresponding to shapes of the first and second mounting members.

3. The mounting assembly according to claim 1, wherein a portion having a substantially spherical shape of the first mounting member is disposed in the first socket.

4. The mounting assembly according to claim 3, wherein the first socket has a substantially spherical shape.

5. The mounting assembly according to claim 4, wherein portions of the first end of the interior arm and the first exterior arm have substantially spherical shapes so as to define the first socket.

6. The mounting assembly according to claim 1, wherein portions having substantially spherical shapes of the first and second mounting members are disposed in the first and second sockets.

7. The mounting assembly according to claim 6, wherein the first and second sockets have substantially spherical shapes.

8. The mounting assembly according to claim 7, wherein portions having textured surfaces of the first and second mounting members are disposed in the first and second sockets.

9. The mounting assembly according to claim 1, wherein the adjustment subassembly is configured to permit adjustment of a position of the first and second mounting members relative to the connecting subassembly.

10. The mounting assembly according to claim 9, wherein the adjustment subassembly is configurable to prevent adjustment of the position of the first and second mounting members relative to the connecting subassembly.

11. The mounting assembly according to claim 10, wherein the adjustment subassembly comprises a first fastener disposed through the exterior arms and the interior arm.

12. The mounting assembly according to claim 11, wherein the adjustment subassembly comprises a second fastener cooperatively engaged with the first fastener.

13. A mounting assembly comprising:
    a connecting subassembly comprising:
        first and second exterior arms; and
        an interior arm having first and second ends disposed between the first and second exterior arms, the first end of the interior arm and a portion of the first exterior arm defining a first socket, and the second end of the interior arm and a portion of the second exterior arm defining a second socket;
    first and second mounting members disposed in the respective first and second sockets; and
    an adjustment subassembly configurable to permit adjustment of a position of the first and second mounting members relative to the connecting subassembly,
    wherein the adjustment subassembly is configurable to prevent adjustment of the position of the first and second mounting members relative to the connecting subassembly,
    wherein the adjustment subassembly comprises a first fastener disposed through the exterior arms and the interior arm,
    wherein the adjustment subassembly comprises a second fastener cooperatively engaged with the first fastener, and
    wherein the adjustment subassembly comprises a cam lever positionable to bring one of a plurality of faces of the cam lever adjacent one of the exterior arms.

14. The mounting assembly according to claim 13, wherein the cam lever includes a first face positionable to face the one of the exterior arms and to hold the exterior and interior arms in contact with one another.

15. The mounting assembly according to claim 14, wherein the cam lever includes a second face positionable to face the one of the exterior arms and to permit movement of the exterior arms and interior arm relative to one another.

16. The mounting assembly according to claim 15, wherein the cam lever includes a third face positionable to face the one of the exterior arms and to permit removal of at least one of the first and second mounting members from the connecting subassembly.

17. The mounting assembly according to claim 16, further comprising:
    at least one liner disposed between the connecting subassembly and one of the first and second mounting members, the liner being deformable when the first face of the cam lever contacts the one of the exterior arms.

18. The mounting assembly according to claim 17, wherein the first fastener comprises a bolt, and the second fastener comprises a nut for threadingly engaging the bolt.

19. The mounting assembly according to claim 18, further comprising:
    a third fastener for preventing positioning of the cam lever.

20. The mounting assembly according to claim 19, wherein the third fastener is disposed through a void defined in the cam lever into a portion of the connecting subassembly.

21. The mounting assembly according to claim 20, wherein the third fastener comprises a bolt.

22. A mounting assembly comprising:
    a connecting subassembly comprising:
        first and second exterior arms; and
        an interior arm having first and second ends disposed between the first and second exterior arms, the first end of the interior arm and a portion of the first exterior arm defining a first socket, and the second end of the interior arm and a portion of the second exterior arm defining a second socket;

first and second mounting members disposed in the respective first and second sockets; and a cam lever configured to move between a first orientation permitting positioning of at least one of the first and second mounting members relative to the connecting subassembly and a second orientation preventing positioning of at least one of the first and second mounting members relative to the connecting subassembly.

23. The mounting assembly according to claim 22, wherein the cam lever includes a first face positionable to face the one of the exterior arms and to hold the exterior and interior arms in contact with one another, and a second face positionable to face the one of the exterior arms and to permit movement of the exterior arms and interior arm relative to one another.

24. The mounting assembly according to claim 23, wherein the first mounting member is mountable to a surface, and the second mounting member is mountable to a portable device.

25. A method of adjusting a mounting assembly including an interior arm disposed between first and second exterior arms, the interior arm and the first exterior arm defining a first socket in which a first mounting member is disposed, and the interior arm and the second exterior arm defining a second socket in which a second mounting member is disposed, the method comprising:

rotating a cam lever to a first position configured to permit movement of at least one of the first and second mounting members; and rotating the cam lever to a second position configured to prevent movement of at least one of the first and second mounting members.

26. The method according to claim 25, which comprises rotating a first face of the cam lever to the first position.

27. The method according to claim 26, which comprises rotating a second face of the cam lever to the second position.

28. The method according to claim 25, further comprising:

rotating the cam lever to a third position configured to permit removal of at least one of the first and second mounting members.

29. The method according to claim 25, further comprising:

mounting one of the first and second members to one of a surface and a portable device.

30. The method according to claim 25, further comprising:

locking a position of the cam lever to prevent further movement between the first and second positions.

31. A mounting assembly, comprising:

an interior arm disposed between first and second exterior arms, the interior arm and the first exterior arm defining a first socket in which a first mounting member is disposed, and the interior arm and the second exterior arm defining a second socket in which a second mounting member is disposed; and a cam lever rotatable to a first position to permit movement of at least one of the first and second mounting members and rotatable to a second position to prevent movement of at least one of the first and second mounting members.

32. A mounting assembly comprising:

a connecting subassembly comprising:

first and second exterior arms; and a single interior arm having first and second ends disposed between the first and second exterior arms, the first end of the interior arm and a portion of the first exterior arm defining a first socket configured to receive a mounting member, and the second end of the interior arm and a portion of the second exterior arm defining a second socket configured to receive another mounting member.

33. The mounting assembly according to claim 32, further comprising:

first and second mounting members disposed in the first and second sockets; and an adjustment subassembly comprising a lever positionable to permit movement of the first mounting member within the first socket upon application of a force insufficient to move the second mounting member within the second socket.

* * * * *